May 4, 1954   C. W. J. HEDBERG   2,677,439
COLLECTION OF SUSPENDED PARTICLES
Filed Nov. 20, 1952                2 Sheets-Sheet 1
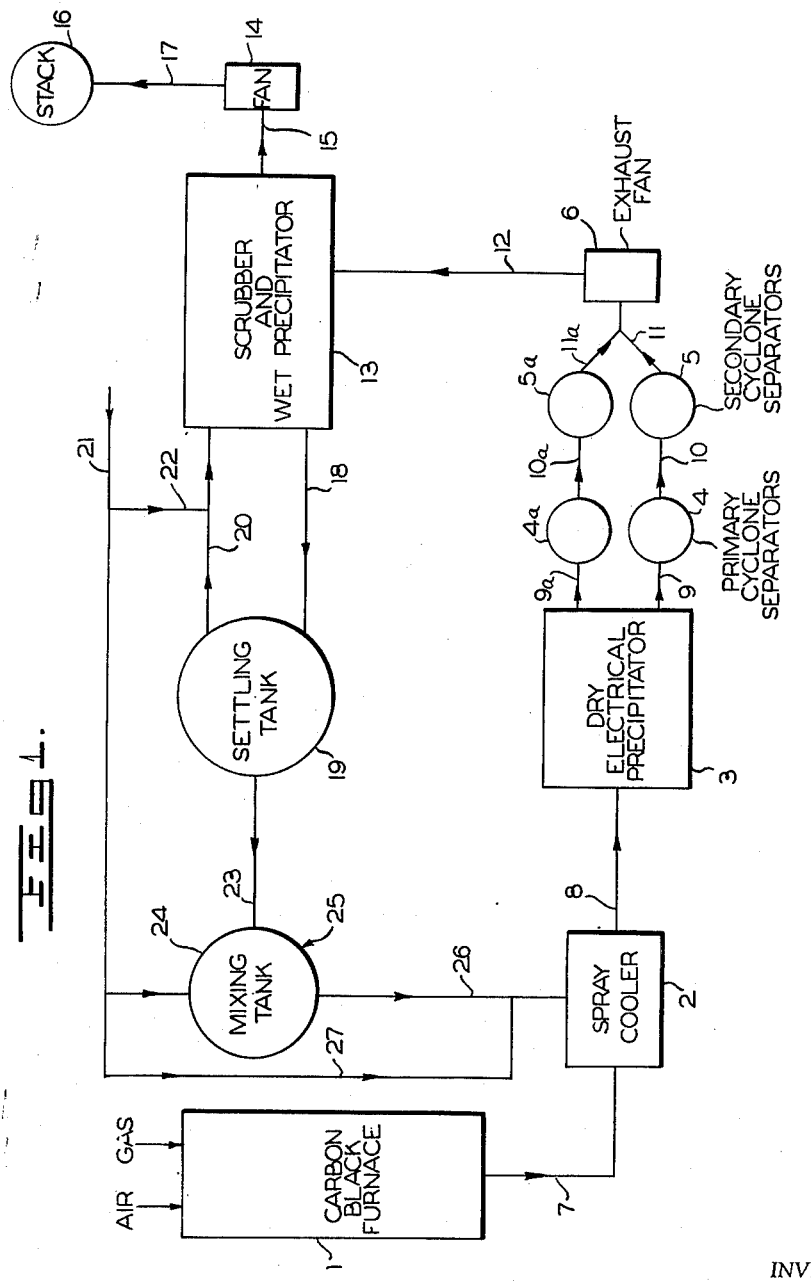
INVENTOR
CARL W. J. HEDBERG
BY  Harold T. Stowell
                ATTORNEY

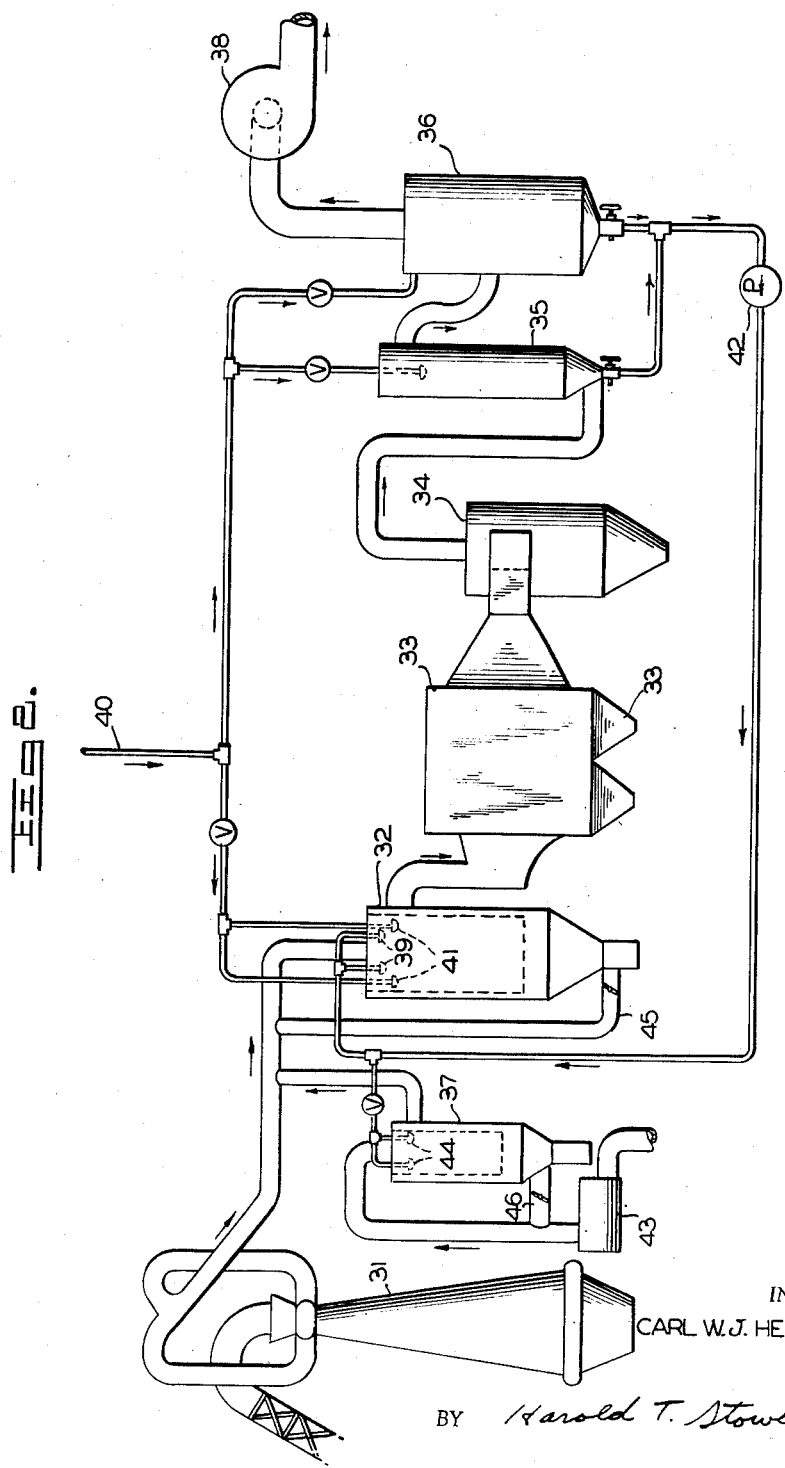

Patented May 4, 1954

2,677,439

UNITED STATES PATENT OFFICE 2,677,439

COLLECTION OF SUSPENDED PARTICLES

Carl W. J. Hedberg, Bound Brook, N. J., assignor to Research Corporation, New York, N. Y., a corporation of New York Application November 20, 1952, Serial No. 321,571

9 Claims. (Cl. 183—120)

This invention relates to the collection of water-insoluble solid particles suspended in the hot gaseous products of industrial processes.

A principal object of the invention is to provide a process and apparatus for the efficient removal of suspended water-insoluble material from hot industrial gases.

A further object of the invention is to provide a process and apparatus which will substantially completely eliminate suspended water-insoluble material from hot industrial gases and dispose of water used in cooling and washing such gases.

Another object of the invention is the substantial elimination of both atmospheric and stream contamination by water-insoluble material suspended in hot gases produced in industrial processes.

A particular object of the invention is to provide a process and apparatus for the efficient removal of carbon black from gases formed by the thermal decomposition and partial combustion of natural gas or other fluid hydrocarbons.

Another object is to provide a process and apparatus for collecting and reworking carbon black that ordinarily escapes from the dry collectors employed in carbon black plants.

Another object is to provide a process and apparatus for recovering carbon black in a finely divided dry state at high efficiency and in a condition finding ready acceptance in the market.

Another object is to provide a process and apparatus for eliminating the objectionable smoke and soot deposits commonly associated with carbon black plants.

Another object is to provide a process and apparatus for this purpose that includes the necessary steps or components for complete disposal of all carbon contaminated water produced in operation.

Still another object is to provide a process and apparatus for removing carbon black from the gases leaving the dry collectors of a carbon black plant by means of wet collectors and introducing the carbon-liquid slurry from the wet collectors, preferably after concentration, into the stream of plant gases at a location where sufficient heat is available to evaporate the liquid and leave the carbon black suspended in the gas stream.

The method of the invention comprises passing a stream of hot gases containing solid water-insoluble particles suspended therein through a cooling zone, passing the gases from the cooling zone through a dry collecting zone and separating a substantial section of the suspended particles therein in a dry condition, thereafter passing the gas stream through a wet collecting zone and separating a major portion of the residual suspended particles therein in contact with water and injecting an aqueous slurry of the water-insoluble particles collected in the wet collecting zone into the hot gases in the cooling zone under flash-drying conditions whereby the liquid portion of the slurry is substantially vaporized and the solid content thereof is substantially resuspended in the cooled gas stream.

Preferably, the slurry obtained from the wet collecting zone is subjected to gravity concentration to provide a concentrated fraction that is passed to the cooling zone and a dilute fraction that may be recirculated to the wet collecting zone to be utilized in the collection of additional suspended particles. Preferably, also, the concentrated fraction of slurry that is passed to the cooling zone is treated with a dispersing or wetting agent to improve the dispersion of the suspended particles in the liquid.

The invention may be embodied in apparatus for collecting water-insoluble particles entrained in a stream of hot gases which comprises a cooling chamber, a collecting device for separating entrained solid particles in a dry condition from a stream of gases passed therethrough, a collecting device for separating entrained solid particles in the form of an aqueous slurry from a stream of gases passed therethrough, means for conducting a stream of hot furnace gases successively through said cooling chamber and collecting devices, conduit means for conducting an aqueous slurry of solid particles from the wet collecting device to the cooling chamber, and means for injecting the aqueous slurry of solid particles into hot gases in the cooling chamber.

The cooler preferably takes the form of a spray chamber but may include in addition auxiliary radiant cooling devices such as extended lengths of metal flue through which the gas stream is passed.

The dry collecting device may include an electrical precipitator, wherein the entrained solid particles are agglomerated and in part collected, and one or more centrifugal separators of the cyclone type for the collection of the bulk of the agglomerated particles.

The wet collecting device preferably includes a scrubber and a wet electrical precipitator arranged in series.

For the purpose of concentrating the aqueous slurry of solid particles obtained from the wet collecting device, the usual classifier or thickener may be employed.

The invention will be set forth with greater particularity in the following detailed description of one embodiment thereof taken in connection with the accompanying drawing wherein:

Fig. 1 is a diagrammatic representation of a carbon black plant including the invention; and Fig. 2 is a diagrammatic representation of a plant for cleaning blast furnace gases embodying the principles of the invention.

In Fig. 1, the carbon black plant shown includes a carbon black furnace 1, a cooler 2, a dry electrical precipitator 3, a parallel arrangement of primary cyclone separators 4 and 4a, a similar arrangement of secondary cyclone separators 5 and 5a, and an exhaust fan 6. This much of the combination of equipment is known in the art of manufacturing carbon black, but, as will be shown, the efficiency of collection of carbon black in such a plant is not as high as desirable and a portion of the carbon black, mostly in the form of fine floc, escapes from the cyclone collectors, the amount so escaping being large enough to cause an objectionable deposit of carbon in the surrounding area and a significant economic loss. It will be understood that, in the prior art plant, the exhaust fan 6 is connected to a suitable stack through which the waste gases are disposed of to the atmosphere.

In the known plant, the combustion gases bearing suspended carbon black pass through the conduit 7 to the cooler at a temperature of about 2,000° F. to 2500° F. In the cooler, water is sprayed directly into the stream of hot gases to reduce the temperature thereof to about 300° F. to 600° F. The cooling is effected by evaporation of the water spray and the supply of water to the cooler is controlled so as to obtain practically complete evaporation of same.

The cooled gases flow from the cooler through the conduit 8 to the dry electrical precipitator 3 in which the gases are passed through high tension electric fields and subjected to ionizing discharge between the customary complementary discharge and extended surface electrodes of the precipitator. Some of the carbon black entrained in the cooled gas stream is precipitated and collected in the electrical precipitator 3, but the bulk of the particles are agglomerated and retained in suspension in the gas stream from which they are separated in continuous process in cyclone separators. Agglomeration of the carbon black particles facilitates such collection.

Gases leave the precipitator 3 at a temperature of from about 275° F. to 550° F. and pass through the conduits 9, 9a to the primary cyclone separators 4, 4a in which a large part of the entrained agglomerated carbon black is separated from the gas stream and continuously transported to the packing house.

From the primary cyclones, the gases pass by way of conduits 10, 10a to the secondary cyclones 5, 5a in which an increment of entrained carbon black is separated from the gas stream in the dry state.

The gases then flow through the conduits 11, 11a to the exhaust fan 6 and are pumped to the fan outlet 12. The temperature of the gases leaving the fan may range from about 250° F. to 500° F. and, in the known plant, such gases are exhausted to atmosphere through a suitable stack. They carry a substantial amount of carbon black that has escaped separation in the dry precipitator and cyclone separator assembly, which carbon black has heretofore polluted the surrounding atmosphere.

In order to prevent such loss, I subject the gases from the exhaust fan 6 to a supplemental wet cleaning operation before venting the gases to the atmosphere.

For this purpose, I provide a unitary combined scrubber and wet electrical precipitator 13 to which the fan outlet conduit 12 is connected to lead the gases first through the scrubber and then through the wet electrical precipitator. The scrubber and wet precipiator combination may be of the type shown in United States Patent 2,273,194, Hedberg et al., or of similar construction.

In the combined wet cleaner, the scrubber is immediately followed by a precipitator equipped with water sprays which are operated continuously or intermittently to wash off any black that may deposit on the electrodes. The scrubber and wet precipitator combination possesses characteristics peculiarly adapted for present purposes. The scrubber section removes most of the agglomerated black which was not separated in the cyclone separators, which agglomerated portion constitutes the bulk of the escaping black. There remains a relatively small amount of unagglomerated black which cannot be removed in the scrubber but which is precipitated in the precipitator section and deposits on the electrodes. Because of the very low density of the deposited black and because it is not readily wetted, only a very thin deposit of black can be retained on the electrodes. If the deposit becomes too heavy, portions are eroded from the surface by the gas stream and again escape as agglomerates or they are broken up and float away with the gas when it is attempted to wash them from the electrodes by a water stream. By removing the major portion of the black before the precipitator section, the scrubber makes it possible to utilize a precipitator for collection of that small residue on which the scrubber is not effective.

Cleaned gases from the scrubber-precipitator are drawn by an exhaust fan 14 through a conduit 15. The exit gases are at the relatively low temperature of about 125° F. to 200° F. and are substantially saturated with water vapor and substantially free from carbon black. They are blown to the stack 16 through a pipe 17 and thence to atmosphere.

The stack may be provided with means for reheating the gases before they are exhausted to atmosphere in order to increase the degree of water unsaturation thereof and thus prevent precipitation of rain in the vicinity of the stack. Such reheating means may take the form of a simple furnace at the base of the stack exhausting flue gases into the stack which mingle with and raise the temperature of the cleaned gases from the scrubber-precipitator.

In the scrubber-precipitator, the carbon black is collected in the form of a water slurry, and, as such, is not a salable item. It must be dried and reduced to appropriate fineness in order to have commercial value.

I have found that the slurry of carbon black can be refined for use by returning the slurry to the hot furnace gases at a suitable point, preferably before or in the dry collection system, and there spraying it into the hot gas stream to evaporate the water and resuspend the carbon black in the gas stream in a fine condition while at the same time cooling the gas stream to the desired temperature. Preferably, the slurry of carbon black is concentrated and treated with a dispersing agent to increase the settling time of the carbon black and, thereafter is sprayed into the cooler 2. The amount of water in the slurry may be adjusted to provide all the water required for cooling the gas or, if additional water is needed for cooling, it may be added to the slurry or separately sprayed into the cooler. Preferably, the amount of water in the slurry is adjusted so that all of the contaminated waste water from the scrubber-precipitator will be disposed of in this manner and without requiring separate water disposal means.

In returning the wet carbon black to the system, the wash waters from the scrubber and precipitator sections containing carbon black in suspension preferably are combined in a sump of the unit 13 and are caused to flow through the pipe line 18 to a settling tank or hydraulic classifier 19 in which the waters are separated into two fractions. One fraction, usually that taken off at the bottom of the classifier, contains most of the suspended carbon black and the other fraction is substantially clear or free from carbon black.

The clear effluent from the settling tank preferably is returned to the scrubber-precipitator 13 through a pipe 20 to be used as feed water for the scrubber-precipitator. Makeup water may be added as necessary from the main 21 through a connection 22.

Concentrated slurry is run through the pipe 23 to a mixing tank 24 provided with a conventional agitator. In the mixing tank, a small amount of a dispersing agent is added to the slurry through the pipe 25 to prevent settling of the carbon black. Any of the common dispersing agents are effective but I prefer to employ a product known as "Daxad 11" (sodium salt of alkylnaphthalene sulfuric acid) supplied by Dewey and Almy Chemical Co. of Cambridge, Massachusetts Other dispersing agents such as Turkey red oil or the like may also be used. The concentration of the slurry in the mixing tank is widely variable and may range from about 200 grains of carbon black per gallon of slurry to several thousand grains per gallon. Small amounts of dispersing agent of the order of 0.025% to 0.050% on the basis of the carbon black in the slurry may be employed successfully.

From the mixing tank, the slurry is pumped through a pipe 26 to spray devices in the cooler. The slurry may be diluted if desired by water conducted from the main 21 through a branch pipe 27.

In practice, the carbon black slurry may be sprayed or injected into the stream of hot gases at any suitable point from the point of production of the carbon black to the point of final dry collection so long as the gases contain sufficient heat to vaporize substantially all of the liquid of the slurry without cooling the gases below the dew point until they have passed beyond the dry collectors. The carbon black slurry may also be sprayed into a portion of the stream of hot gases diverted through a separate spray drying chamber. If a separate chamber is employed, the cooled gases are then returned to the cooled gases of the known plant before the precipitator; and any black which may have separated in the separate spray chamber is returned to the main stream of product black. It is also possible to flash-dry the carbon black slurry in an independent flash-drying apparatus and to collect the carbon black from the flash-drier gases separately from the principal collection system or in admixture with the primary carbon black in the principal collection system.

The action of the hot gases in the cooler is to flash-dry the slurry and re-entrain the carbon black particles in the stream of hot gases. The re-entrained carbon black particles are mixed in the gas stream with primary carbon black particles from the furnace and are collected in the system as hereinbefore described.

In the apparatus of Fig. 2, 31 is a blast furnace, 32 is a spray-drying and cooling tower, 33 is a dry electrostatic precipitator, 34 is a dry collector of the cyclone type, 35 is a wet scrubber tower, such as the scrubber shown in U. S. Patent 2,203,592, and 36 is a wet-type electrostatic precipitator. 37 is an auxiliary spray-drying tower.

Hot gases from furnace 31 containing suspended soluble water-insoluble particles, typically having a high content of metal values, such as oxides of iron, are drawn through the collecting and purifying system by means of fan 38. The gases are cooled and partially humidified in cooling tower 32 by the flash evaporation of the water content of the aqueous slurry sprayed into the tower through sprays 39. The partially cooled and humidified gases are then passed through the dry electrostatic precipitator 33 wherein a substantial portion of the solid particles are precipitated and deposited in the hopper 33' of the precipitator. A further portion of the suspended material, particularly material which has been agglomerated in passing through precipitator 33, is then collected in cyclone collector 34. The gases containing residual suspended particles are then washed with water in scrubber 35 and given a final cleaning in wet precipitator 36. From precipitator 36 the gases pass through fan 38 to a stack, not shown, or to utilization, for example, in gas engines or in blast heating stoves.

Water is supplied to the scrubber and wet precipitator from main 40, which also provides water to sprays 41 of cooling tower 32 when the water content of the slurry from the scrubber and wet precipitator is insufficient. The slurry from the scrubber and wet precipitator is pumped to sprays 39 of cooling tower 32 by pump 42. The slurry from the scrubber or the wet precipitator or both may be thickened and the water portion from the thickener recirculated to the scrubber or wet precipitator as in the system of Fig. 1.

When the heat content of the gases coming from furnace 31 is insufficient to evaporate all of the water content of the slurry produced by the scrubber and wet precipitator, a portion of gas from any desired point in the system, or a stream of air or inert gas, is heated in auxiliary furnace 43 and passed through auxiliary tower 37, to which the excess slurry is supplied through sprays 44.

It is advantageous to supply a portion of the hot gases from the furnace to the bottom of the spray drier 32 through conduit 45 to eliminate the possibility of water or slurry accumulating in the bottom of the drier. Similar provision is made in spray drier 37 by means of pipe 46.

It will be seen that the system of the invention not only results in substantially complete recovery of the solids suspended in the furnace gases thereby eliminating atmospheric pollution but also eliminates stream pollution by evaporating into the gases all of the water used in the final cleaning steps, and thereby provides that all of the solid material removed from the gases is obtained in dry, readily usable or disposable form.

This application is a continuation-in-part of my application Serial No. 2,312 filed January 14, 1948, now abandoned.

I claim:

1. The method of collecting suspended solid water-insoluble particles from hot gases which comprises passing the hot gases through a cooling zone, passing the gases from the cooling zone through a dry collecting zone and separating a substantial portion of the suspended particles therein in dry condition, thereafter passing the gas stream through a wet collecting zone and separating a major portion of the residual suspended particles therein in contact with water, and injecting an aqueous slurry of the water insoluble particles collected in the wet collecting zone into the hot gases in the cooling zone under flash-drying conditions whereby the liquid portion of the slurry is substantially vaporized and the solid content thereof is resuspended in the cooled gas stream.

2. The method of collecting suspended solid water-insoluble particles from hot gases which comprises passing the hot gases through a cooling zone wherein the gases are cooled by the injection of water in amount insufficient to saturate the gases, passing the gases from the cooling zone through a dry collecting zone and separating a substantial portion of the suspended particles therein in dry condition, thereafter passing the gas stream through a wet collecting zone and separating a major portion of the residual suspended particles therein contact with water, and injecting an aqueous slurry of the water insoluble particles collected in the wet collecting zone into the hot gases in the cooling zone under flash-drying conditions whereby the liquid portion of the slurry is substantially vaporized and the solid content thereof is resuspended in the cooled gas stream.

3. The method of collecting suspended solid water-insoluble particles from hot gases which comprises passing the hot gases through a cooling zone wherein the gases are cooled by the injection of water in amount insufficient to saturate the gases, passing the gases from the cooling zone through a dry collecting zone and separating a substantial portion of the suspended particles therein in dry condition while maintaining the gas stream at a temperature above the dew point thereof, thereafter passing the gas stream through a wet collecting zone and separating a major portion of the residual suspended particles therein in contact with water, and injecting an aqueous slurry of the water insoluble particles collected in the wet collecting zone into the hot gases in the cooling zone under flash-drying conditions whereby the liquid portion of the slurry is substantially vaporized and the solid content thereof is resuspended in the cooled gas stream.

4. A method of collecting carbon black particles entrained in a stream of hot gases from a carbon black furnace which comprises passing said stream of hot gases through a cooling zone, passing the gases from the cooling zone through a dry collecting zone and separating a substantial portion of entrained carbon black therein in a dry condition, thereafter passing the gas stream through a wet collecting zone and separating a major portion of the residual entrained carbon black therein in contact with water, and injecting an aqueous slurry of the carbon black collected in the wet collecting zone into the hot furnace gases in said cooling zone under flash-drying conditions, whereby the liquid portion of the slurry is substantially vaporized and the carbon black content thereof is substantially re-entrained in the cooled gas stream.

5. A method of collecting carbon black particles entrained in a stream of hot gases from a carbon black furnace which comprises passing said stream of hot gases through a cooling zone wherein the gases are cooled by the injection of water in amount insufficient to saturate the gases, passing the gases from the cooling zone through a dry collecting zone and separating a substantial portion of entrained carbon black therein in a dry condition, thereafter passing the gas stream through a wet collecting zone and separating a major portion of the residual entrained carbon black therein in contact with water, and injecting an aqueous slurry of the carbon black collected in the wet collecting zone into the hot furnace gases in said cooling zone under flash-drying conditions, whereby the liquid portion of the slurry is substantially vaporized and the carbon black content thereof is substantially re-entrained in the cooled gas stream.

6. A method of collecting carbon black particles entrained in a stream of hot gases from a carbon black furnace which comprises passing said stream of hot gases through a cooling zone wherein the gases are cooled by the injection of water in amount insufficient to saturate the gases, passing the gases from the cooling zone through a dry collecting zone and separating a substantial portion of entrained carbon black therein in a dry condition while maintaining the gas stream at a temperature above the dew point thereof, thereafter passing the gas stream through a wet collecting zone and separating a major portion of the residual entrained carbon black therein in contact with water, and injecting an aqueous slurry of the carbon black collected in the wet collecting zone into the hot furnace gases in said cooling zone under flash-drying conditions, whereby the liquid portion of the slurry is substantially vaporized and the carbon black content thereof is substantially re-entrained in the cooled gas stream.

7. A method of collecting carbon black particles entrained in a stream of hot gases from a carbon black furnace which comprises passing said stream of hot gases through a cooling zone, passing the gases from the cooling zone through a dry collecting zone and separating a substantial portion of entrained carbon black therein in a dry condition, thereafter passing the gas stream through a wet collecting zone and separating a major portion of the residual entrained carbon black therein in contact with water to form an aqueous slurry of carbon black, concentrating said aqueous slurry, and spraying the concentrated slurry into the hot furnace gases in said cooling zone under flash-drying conditions, whereby the liquid portion of the slurry is substantially vaporized and the carbon black content thereof is substantially re-entrained in the cooled gas stream.

8. A method of collecting carbon black particles entrained in a stream of hot gases from a carbon black furnace which comprises passing said stream of hot gases through a cooling zone, passing the gases from the cooling zone through a dry collecting zone and separating a substantial portion of entrained carbon black therein in a dry condition, thereafter passing the gas stream through a wet collecting zone and separating a major portion of the residual entrained carbon black therein in contact with water to form an aqueous slurry of carbon black, concentrating said aqueous slurry, adding a small amount of a dispersing agent to the concentrated slurry, and spraying the dispersed slurry into the hot furnace gases in said cooling zone under flash-drying conditions, whereby the liquid portion of the slurry is substantially vaporized and the carbon black content thereof is substantially re-entrained in the cooled gas stream.

9. The process of recovering carbon black from the hot effluent gases of a carbon black furnace comprising the steps of conducting the hot black-laden gases to a cooling zone, spraying them with an aqueous slurry of carbon black thereby vaporizing the water constituent of the slurry and reducing the temperature of the hot gases, separating a major portion of the suspended carbon from the cooled gases in dry finely divided form, washing the gases having residual carbon suspended therein with an aqueous liquid thereby removing residual carbon from said gases, forming an aqueous slurry with said residual carbon and said liquid, and spraying this slurry into the hot gases in the said cooling zone.

References Cited in the file of this patent

UNITED STATES PATENTS

| Number | Name | Date |
|---|---|---|
| 866,706 | Zellweger | Sept. 24, 1907 |
| 1,799,084 | Brdar | Mar. 31, 1931 |
| 1,801,436 | Lewis | Apr. 21, 1931 |
| 2,273,194 | Hedberg et al. | Feb. 17, 1942 |
| 2,368,828 | Hanson et al. | Feb. 6, 1945 |